Figure 1:
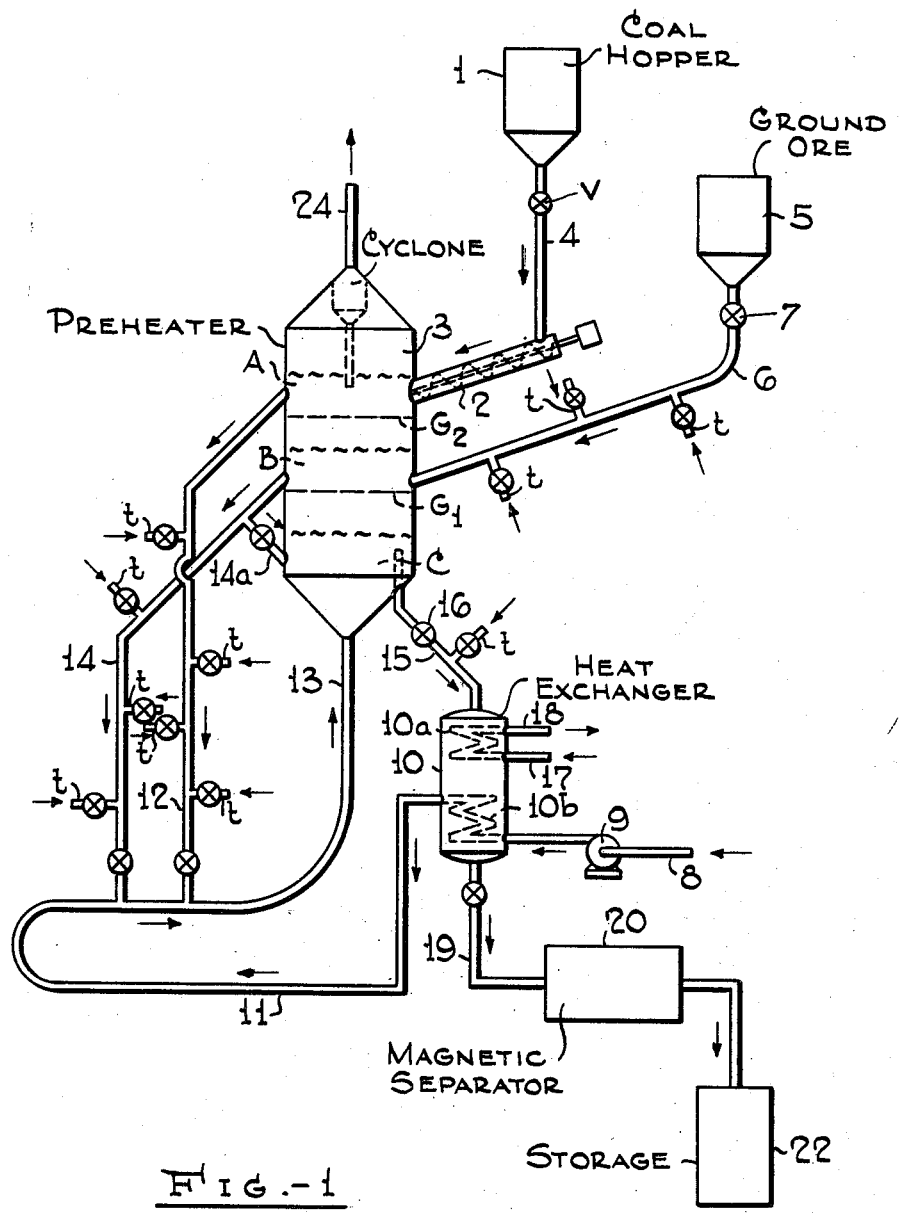

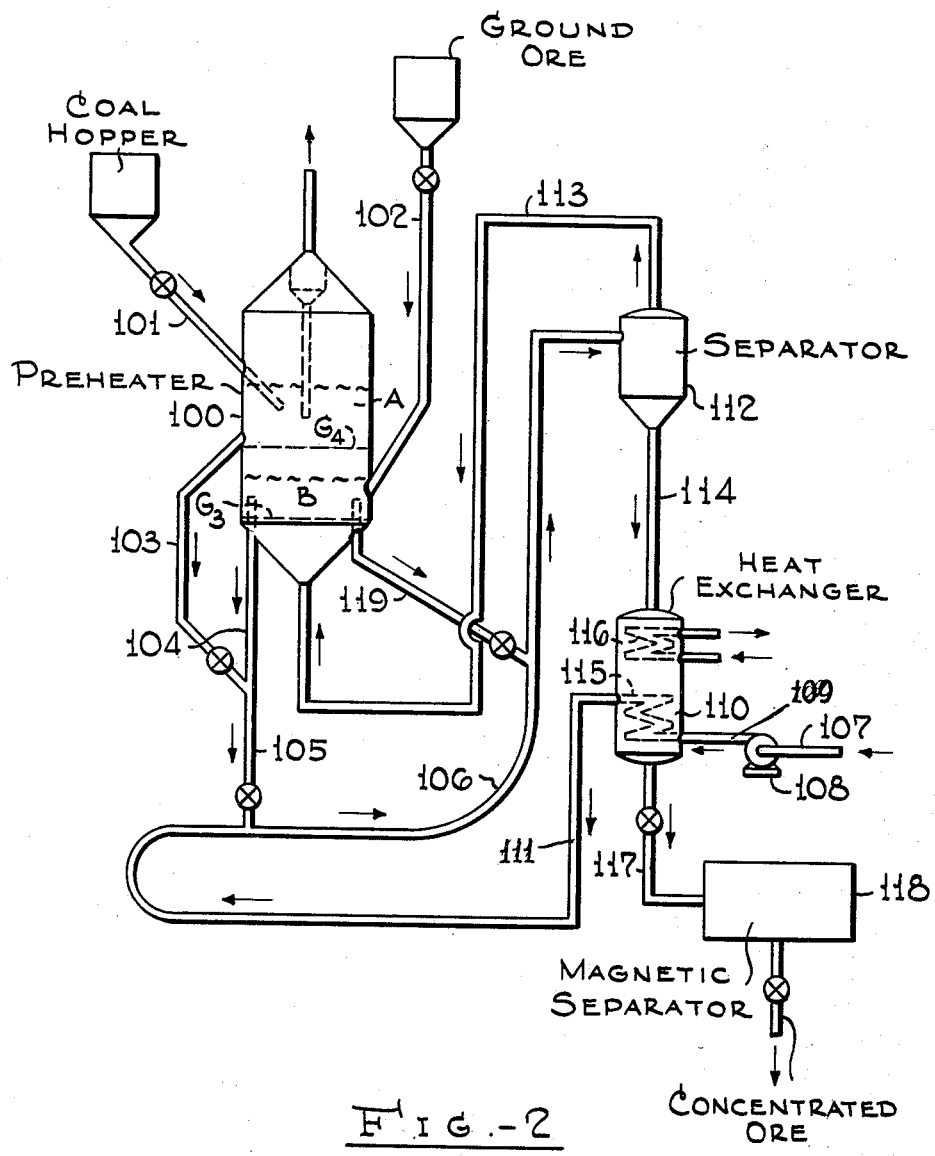

Patented Oct. 19, 1954

2,692,050

UNITED STATES PATENT OFFICE 2,692,050

PARTIAL REDUCTION OF IRON ORE

Karl J. Nelson, Cranford, N. J., assignor to Standard Oil Development Company, a corporation of Delaware Application September 9, 1950, Serial No. 183,935

8 Claims. (Cl. 209—214)

The present invention is fully disclosed in the following specification and claims, and the accompanying drawing forming a part of the present specification.

The present invention relates to a method of up-grading low grade oxidic iron ores to render them more suitable for subsequent smelting to form iron and/or steel by means of a process which is more economical.

It is well known that the supply of high grade iron ores in the United States is rapidly being depleted, and the steel industry is faced with the necessity of finding processing methods for utilizing leaner ores. It is well known that lean ores may be concentrated by partially reducing the $Fe_2O_3$ (which is the form in which most iron ores occur in nature) to $Fe_3O_4$ which latter has magnetic properties. The partial reduced ore is normally ground and then separated using wet magnetic separation methods. The concentrated ore is then agglomerated by briquetting, nodulizing, etc., to a suitable size which can be fed to conventional blast furnaces.

It has been proposed to employ a processing system consisting of a producer gas generator of the fluid solids type (or the fixed bed type) to form a relatively high quality producer gas and a second vessel in which the producer gas formed in the first vessel is employed to reduce oxidic iron ore to the $Fe_3O_4$ form. This proposal also includes, in conjunction with the producer gas generator and the reducer, a gas combustion zone, means for preheating the bed of iron ore, means for recovering sensible heat from the off-gases and other conventional methods for effecting economics. But this process is characterized in that a relatively rich producer gas containing from 25-40% of $CO+H_2$ is used as the reducing gas, whereas, only a minor portion of this gas, say 4-12%, is required for the partial reduction chemical reaction. The off-gas from reduction, containing the remaining and major portion of the inlet $CO+H_2$ is then burned with oxygen containing gas, the heat so generated being used to preheat the raw ore. The cost of manufacturing such high quality producer gas is high and is the major item of expense in the system indicated for reducing iron ore. The use of such gas from the conventional fixed bed producer, or from fluid producer gas generators will not meet the economics required by the process. The reactions in the conventional producer may be represented as follows:

  (1)
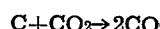  (2)
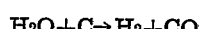  (3)
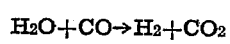  (4)

Reaction 1 above is highly exothermic and serves to supply the heat required to support Reactions 2 and 3 which are endothermic. Reaction 4 is the water gas shift reaction which does not give off or take up much heat. The steam serves to control the temperature as well as, of course, to add useful constituents to the product gas. Reaction 1 is very rapid, whereas, the reduction in Reactions 2 and 3 are relatively slow. Accordingly, it can be seen that due to the slowness of Reactions 2 and 3 to produce a gas which is relatively rich in $CO+H_2$, a large reaction volume is required. Obviously, this factor of large reaction volume effects the economics unfavorably.

According to the present invention, a lean producer gas is made, that is to say, one that contains a relatively large amount of $CO_2$ and a small amount of $CO$, of the order of, say, ⅙ of that produced in the ordinary producer gas. The product gas is also low in $H_2$ content. As will more fully appear hereinafter, according to the present process, the producer gas is formed in situ in the reducing zone in the presence of the preheated ore to be reduced. The ore is fed to the reducing zone at a relatively low temperature and the heat which is evolved during the formation of the carbon dioxide is at least partially taken up by the ore and it is thus heated to reduction temperatures. Consequently, virtually complete utilization of the heat available by combustion of the carbon in the present process is realized by direct combustion of the coal, whereas, of course, in the conventional method, as pointed out above, the ore is heated to reduction temperatures by burning the major portion of the rich expensive producer gas.

A principal feature of this invention, as indicated, involves the manufacture and use of a low $CO$-containing producer gas (lean gas) by burning with air low grade carbonaceous material such as "off-grade" coal or coke, also lignite, petroleum oils, pitches, petroleum residuums, etc., in the presence of the ore in a reducing zone. This procedure renders the process economically feasible because the large amount of heat released by combustion of the carbonaceous material to form $CO_2$, is employed in a useful manner as previously pointed out, to heat the ore. It is further pointed out that it is merely necessary in the present process to produce in the reducing zone only about the stoichiometric quantity of $CO$ required to react with the $Fe_2O_3$ to form $Fe_3O_4$. This condition is attained by controlling the temperature, air to carbon ratio, and carbon hold-up, so that the quantity of $CO$ formed during the making of the lean producer gas is that required to effect the desired chemical reduction reaction. This quantity of $CO$ is much smaller than that formed in the conventional process, all of which will appear more fully from a specific example hereinafter set forth.

Another important economy effected according to the present method is that the amount of equipment required to form the lean producer gas is small compared to conventional equipment and may consist of two standpipes and a riser tube with a vessel for preheating the ore and the coal. However, if it is found that additional reduction volume is required, this can be provided as a bottom bed in the preheating and drying vessel. It is, however, more economically feasible to operate the main reducing zone at temperatures high enough to avoid this latter expedient.

Another important advantage of the invention is that a fluid preheating vessel which operates at relatively low temperatures allows a vessel of smaller diameter to be used for this purpose. Also, this vessel may be made of cheaper material. The system may, however, require in one modification that a hot "cyclone" separator be used, operating on the entire solids stream.

The present invention relates, as indicated, to a method of treating a low grade oxidic iron ore containing iron in the form of $Fe_2O_3$ to form the magnetic oxide $Fe_3O_4$, which magnetic oxide may be then separated from a large portion of the associated gangue using the so-called wet magnetic separation methods.

The object of the invention is to provide an improved process for converting low grade oxidic iron ores into a concentrate which may be more readily and cheaply processed to form iron and steel products.

Another object of the present invention is to convert oxidic iron ore of low grade into a magnetic form of iron by the use of a reducing gas formed in situ in the reduction zone.

Another object of the present invention is to produce a reducing gas adapted to convert oxidic iron ore to a magnetic form, from a cheap coal, from petroleum pitches, residues, etc. in lieu of expensive coal or coke.

Other and further objects of the present invention will appear from the following more detailed description.

In the accompanying drawings there is shown in Fig. I, diagrammatically, an apparatus layout in which the invention may be carried into effect; and in Fig. II a modified form of the apparatus of Fig. I is depicted.

Referring in detail to Fig. I, there is therein depicted a vessel 3 in which the coal and the ore may be preheated and a riser 13 in which the ore is reduced in the presence of the lean producer gas which is formed in situ, and there is also shown standpipes connecting the beds of coal and ore with the lower end of the riser. In operation of the process, subdivided low grade coal having a particle size of from 10 to 1000 microns is fed from a supply hopper 1 through a suitable feeder 2 such as a screw feeder into a vessel 3 to a bed A which is a fluidized mass as will subsequently appear. The flow of coal from the hopper 1 in line 4 is controlled by suitable valve V. The coal which is fed to vessel 3 may be, as indicated, a low grade coal which is usually available on steel mill properties, or the immediate vicinity. The use of this low grade coal effects, of course, important economies. A low grade iron ore ground to a particle size of from 10 to 1000 microns, is fed from a supply hopper 5 through a standpipe 6 into the vessel 3 to a bed B which is also a fluidized mass. The flow of iron ore from the hopper 5 is controlled by a valve 7, and the standpipe 6 is also provided with a plurality of spaced gas taps $t$ through which an aerating gas may be injected into the standpipe for the purpose of aerating the ore and causing it to flow freely therein. A screw feeder or other suitable feeding means may be employed to feed the ore to the vessel 3.

Air enters the system of Fig. I, through line 8, passes through a compressor 9, which latter forces it through a heat exchanger 10, from which heat exchanger the preheated air passes via line 11 into the lower end of a riser 13. In this riser 13, as will more fully appear hereinafter, the main reduction occurs. This riser may be made from steel and is preferably provided with an inner refractory lining. The coal, preheated and dried in a manner hereinafter explained, is withdrawn from a bed A in vessel 3 via a standpipe 12 provided with the usual gas taps $t$, and simultaneously the ore, preheated as explained hereinafter, is withdrawn from the bed B of vessel 3 through a standpipe 14, provided with the usual gas taps, for improving fluidity of the flowing ore, and both the coal and the ore are charged into the bottom of riser 13 wherein they are suspended in the air. The air burns the carbonaceous material to form at first $CO_2$, releasing a large amount of heat. But the presence of the relatively cooler ore serves to take up this heat and to temper reaction conditions in the riser. A portion of the $CO_2$ reacts with the coal or other carbonaceous material to form a relatively small amount of carbon monoxide. This carbon monoxide reacts with the ore reducing it to the magnetite form and, of course, $CO_2$ is formed by this reaction. As will appear subsequently, the amount of coal or other fuel, ore, and air are so proportioned in the riser that the temperature of 1500°–2500° F. prevails, preferably, temperatures 1800°–2000° F. prevail therein. If coal is employed as the fuel, temperatures above its fusion point should not prevail in the riser. It is apparent that two useful results are thus accomplished. First, a complete utilization of the heat evolved by burning of the carbonaceous material to form $CO_2$ is achieved and secondly, only a relatively small amount of carbon monoxide is formed and this latter feature has the advantage that the amount of equipment required for forming CO is small, virtually amounting to merely two standpipes and the riser. The suspension of ore and carbonaceous material in gasiform material in the riser flows upwardly at flow rate of 10 to 100 feet per second, and discharges into the lower end of vessel 3, forming a fluidized mass indicated at C. The temperature of bed C is maintained at around 1200°–2200° F., preferably 1500°–1700° F., and any unreduced ore is here converted to the $Fe_3O_4$ oxide. A portion of the ore in standpipe 14 is charged via line 14a to a bed C to control the temperature of the bed. The gases in the lower portion of vessel 3 pass upwardly through bed C, and then pass through ore preheating zone B, where they contact the said ore under such conditions as to form a fluidized bed of said ore, which fluidized bed is supported on a grid $G_1$. The gases pass from bed B upwardly and contact the coal in bed A, supported on a grid $G_2$ under conditions such as to form a fluidized bed of said coal, which coal is dried and heated. The gases finally pass out of the vessel 3 through a pipe 24. These off-gases may be utilized in any convenient manner. One good use of them is to protect the partially reduced ore recovered from bed C in subsequent concentrating steps.

It will be understood, of course, that the superficial velocity of the gases passing through vessel 3 is such as to form the three fluidized beds described. By superficial velocity, one means that velocity in the vessel were there no solids therein and a suitable range of such velocities would be from ½ to 4 to 5 feet per second.

The reduced ore is withdrawn from vessel 3 via drawoff pipe 15, controlled by a valve 16 and provided, as usual, with fluidizing gas taps $t$ and charged to the heat exchanger 10 wherein at least a portion of its sensible heat is abstracted to form steam in a coil 10a, the water feeding this coil being introduced through line 17 and the steam formed being withdrawn through line 18. This steam thus produced may be used to drive the air compressor 9, to serve as a fluidizing gas in the various standpipes, and otherwise throughout the plant. The ore in heat exchanger 10 after contacting coil 10a, descends into contact with coil 10b and gives up heat to the air passing through said coil 10b, as previously indicated. The cooled and reduced ore is then withdrawn from heat exchanger 10 via line 19 and delivered to a conventional magnetic separator 20 from which the concentrated $Fe_3O_4$ may be recovered via line 21 and collected in the receiver 22. These magnetic separators may be of the wet or dry process type, so-called. The wet method apparatus such as, the Jeffrey-Stevenson machine or the Crockett-Linney separator and others are preferred. This concentrate after briquetting, nodulizing, extrusion, etc. may then be processed in a blast furnace (not shown) in the usual manner.

In Fig. II the modification therein depicted is one in which the producer gas is formed and the ore is entirely reduced in a riser. More particularly, in Fig. II, 100 represents a vessel into which ground coal from standpipe 101 (or any suitable feeding means) and ground ore from standpipe 102 are charged to separate fluidized beds A and B, respectively, as shown. Standpipes 101 and 102 are provided with the usual gas taps (not shown) to aerate and to increase the fluidity of the solids therein flowing and are in communication with sources of supply, as shown. As before, the beds of ore and coal are supported by foraminous members $G_3$ and $G_4$. In this vessel 100, both the coal and the ore undergo a preliminary heating. Thereafter the coal is withdrawn from bed A via standpipe 103, while simultaneously preheated ore is withdrawn from bed B via standpipe 104 and a confluence of these streams is effected in standpipe 105 which discharges into an air stream in riser 106.

As in the case of the apparatus of Fig. I, air enters this system through line 107, is forced through a compressor 108, thence withdrawn through line 109 and thereafter the compressed air is forced through a heat exchanging coil 110 where it is preheated and thence delivered via line 111 into riser 106 where it co-mingles with the ore and the coal to form a suspension. In the riser 106, the oxygen of the air reacts with the carbon to form $CO_2$ at first, but in the presence of excess carbon a small amount of the $CO_2$ is reduced to CO. The CO rapidly reacts with the $Fe_2O_3$, converting it to $Fe_3O_4$. The reduced oxidic iron ore is then discharged into separator 112 wherein the gas is separated from the solids. The separator may be of the "cyclone" separator type, or any other suitable separating means may be employed to effect the separation. The gas from the separator is withdrawn overhead through line 113 and these gases are discharged into the bottom of the preheater 100 where they serve to fluidize and preheat the ore and coal, respectively. The reduced ore is withdrawn from the separator 112 via line 114, thence passed through a heat exchanger 115, where at least a portion of its sensible heat is abstracted to form steam in coil 116 and also to preheat the air in coil 110, as previously noted. The cooled, reduced ore is then delivered via line 117 to be processed as previously described.

A portion of the preheated ore in bed B of vessel 100 is withdrawn via standpipe 119 and discharged into the upper section of riser 106. The purpose is to reduce temperature in said upper section. This enables operation at relatively high temperatures in the lower section of the riser, which means that conditions are suitable for forming CO rapidly in this section. The subsequent cooling in the upper section reduces gas volume and also protects the subsequent equipment from overheating by contact with the reduced ore. The somewhat lower temperature level in the upper section of the riser which may be from 1200°–2300° F., preferably 1500°–1700° F., is consistent with reducing conditions since the rate of $Fe_2O_3$ reduction by CO is rapid even at these temperatures.

In order further to illustrate the present invention, the following specific example is set forth, with the understanding that the specific conditions therein set forth are purely illustrative and are not to be construed as placing any limitations on the invention.

*Conditions in preheater 3 and riser 13*

| | |
|---|---:|
| Lbs. of coal charged per hour | [1] 4800 |
| Lbs. of ore (per cent $Fe_2O_3$ by weight) charged per hour | [2] 100,000 |
| Average temperature in bed A, ° F | 380 |
| Average temperature in bed B, ° F | 500 |
| Average temperature in bed C, ° F | 1600 |
| Lbs. of coal withdrawn from bed A and charged to riser 13, per hour | 4300 |
| Lbs. of ore withdrawn from bed B per hr. and charged to riser 13 | 74,000 |
| Average temperature in riser 13, ° F | 1900 |
| Lbs. of ore in riser 13 (holdup) | 34,400 |
| Lbs. of carbon in riser 13 (holdup) | 390 |
| Lbs. of ash in riser 13 (holdup) | 420 |
| Lbs. of ore withdrawn from bed B per hour and charged to bed C | 26,000 |
| $CO_2$/CO ratio from bed C | 70/1 |
| Amount of air in standard cubic feet charged to the system per hour | 7000 |
| Temperature of air in line 11, ° F | 500 |
| Back pressure above bed A, p. s. i. g | 1 |

[1] Calorific value=10,700 B. t. u. per hour. Coal contains 10% $H_2O$ and 19% ash (by weight).
[2] 35% by weight—$Fe_2O_3$.

The ore thus reduced may be delivered to a conventional wet magnetic separator wherein a portion of the gangue is removed by said magnetic process to yield a concentrate to the extent that it contains, say, 50% or higher iron oxide. The magnetic concentrate in subdivided form is then agglomerated by briquetting, nodulizing or extruding to a particle size suitable for charging conventional blast furnaces.

It is evident that there are numerous variations of this invention, depending mainly on the extent and method of heat recovery from the gas and solids streams.

The principal advantages of this invention may be summarized as follows:

1. A lean reducing gas is produced by contacting ore, coal and air in a circulating and/or bed system, thus eliminating the necessity of an external producer gas generator manufacturing high quality producer gas. The cost of the lean producer gas will be very low.

2. Excellent thermal efficiencies can be obtained by installing suitable heat exchange facilities operating on both the gas and solids streams.

3. The facilities can be employed so that heat sensitive equipment, such as grids, cyclones, and slide valves, can be operated at relatively low temperatures and, therefore, protected against injury while gaining lower initial cost and reduced maintenance.

4. The system provides energy in the form of by-product steam which may be used for moving the gas compressors or for other purposes.

5. Off gas from the reduction operation can be used to protect the product from reoxidation.

Numerous modifications of the invention may be made by those familiar with the art without departing from the spirit thereof.

What is claimed is:

1. The method of treating a lean oxidic iron ore containing a minor proportion of $Fe_2O_3$ to reduce said $Fe_2O_3$ oxide to the $Fe_3O_4$ magnetic form which comprises providing a chamber divided into several vertically superposed communicable spaced zones, separately charging to separate uppermost zones the iron ore and solid carbonaceous material, both of said materials being in powdered form, maintaining said ore and said carbonaceous material in fluidized state in said zones, passing a heated gasiform material through said zones to dry and preheat the said ore and the said carbonaceous material, withdrawing the preheated ore and carbonaceous material from said chamber and charging them to an air stream wherein they are suspended in said air, maintaining the temperature of the suspension within the range of from about 1500°–2500° F., the ratio of carbonaceous material to ore, in conjunction with the said temperature prevailing in the suspension by forming a heating and reducing atmosphere by causing the conversion in the presence of air of the carbonaceous material into oxides of carbon in which $CO_2$ is formed in relatively large quantity with consequent release of a large quantity of heat, and $CO$ is formed in relatively small quantity, which quantity does not exceed an amount sufficient to cause the reduction of $Fe_2O_3$ to be reduced to the magnetic $Fe_3O_4$, causing the said suspension to flow as a confined stream at a rate of from about 10 to 100 feet per second, charging said suspension into a lower zone in said chamber wherein it is formed into a fluidized bed, withdrawing solids containing $Fe_3O_4$ from said last-named fluidized bed and separating said $Fe_3O_4$ from associated solids by magnetic action.

2. The method specified in claim 1 in which the ratio of $CO_2$ to $CO$ in the said lower zone in the said chamber is about 70 to 1, and in which zone the reduction of the $Fe_2O_3$ is substantially completed.

3. The method set forth in claim 1 in which the gasiform material from the lower zone is passed through the upper zones of said chamber to preheat the fluidized beds of carbonaceous solids and ore.

4. The method set forth in claim 1 in which preheated ore is withdrawn from an upper zone in said chamber and charged directly to a lower zone containing ore charged thereto from said suspension.

5. The method set forth in claim 1 in which reduced ore withdrawn from the chamber is passed in heat exchange relationship with the air fed to the suspension in order to preheat said air.

6. The method set forth in claim 1 in which the carbonaceous material is a powdered low grade coal.

7. The method set forth in claim 1 in which the carbonaceous material is petroleum pitch.

8. The method set forth in claim 1 in which the oxidic iron ore contains less than 50% of iron oxide in the form of $Fe_2O_3$.

References Cited in the file of this patent

UNITED STATES PATENTS

| Number | Name | Date |
|---|---|---|
| 1,588,420 | Hindshaw | June 15, 1926 |
| 2,184,300 | Hodson et al. | Dec. 26, 1939 |
| 2,269,465 | Lykken | Jan. 13, 1942 |
| 2,296,522 | Hartley | Sept. 22, 1942 |
| 2,441,594 | Ramseyer | May 18, 1948 |
| 2,473,795 | Hills et al. | June 21, 1949 |
| 2,477,454 | Heath | July 26, 1949 |

OTHER REFERENCES

Journal of the Americal Chemical Society, vol. 44 (1922), page 988.